Oct. 31, 1961   H. J. McCAULEY, JR   3,006,230
SHEET METAL WEDGE NUT HAVING WEDGING END PORTIONS
Filed July 22, 1958
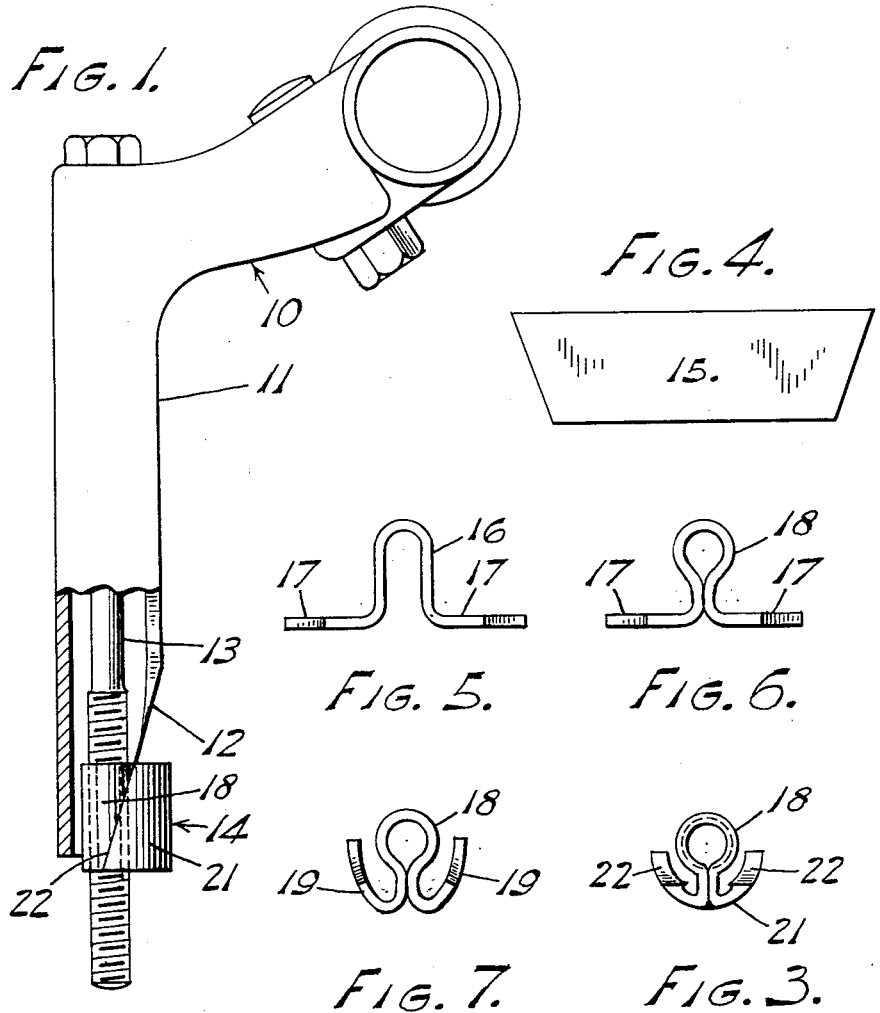
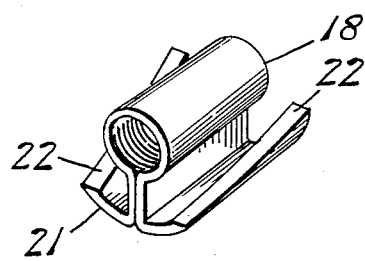
FIG. 2.
INVENTOR.
HERBERT J. McCAULEY, JR.
BY
Bean Brooks Buckley & Bean
ATTORNEYS

United States Patent Office 3,006,230
Patented Oct. 31, 1961

3,006,230
SHEET METAL WEDGE NUT HAVING WEDGING END PORTIONS
Herbert J. McCauley, Jr., 731 W. Ferry St., Buffalo 22, N.Y.
Filed July 22, 1958, Ser. No. 750,131
6 Claims. (Cl. 85—32)

This invention relates to handlebar steering posts for bicycles and more particularly to a novel wedge nut device for clamping such steering posts within the hollow stem of a bicycle front wheel fork member.

A common and well-known means of locking the handlebar support member to the upper end of the front fork of a bicycle comprises forming a bevel at the lower end of the steering post within the hollow stem and providing a wedge nut device which engages against the bevel and produces an expanding action when the wedge nut is drawn upwardly in engagement with the bevel portion by means of a screw or bolt accessible from the top of the steering post.

Wedge nuts for the general purpose outlined above have previously been of cast or forged metal which is somewhat expensive for devices of this sort and results in a part having rough surfaces. Since it is not economically feasible to machine the wedging surfaces such wedge nuts have been rather crude, inaccurate and non-uniform in the resulting clamping action.

A structure of the general type involved in the present invention is illustrated in the present applicant's prior Patent No. 2,487,661, dated November 8, 1949. In this prior patent the wedge nut is stamped from sheet metal but the design is such that a very heavy gauge metal must be employed to afford even a minimum length of thread contact with the tightening screw or bolt, and even then the length of thread contact in the wedge nut is the weakest part of the clamping structure.

The wedge nut of the present invention is so designed and constructed that it may be formed by relatively simple stamping operations from sheet metal of moderate gauge and wherein the length of thread contact is not limited by or to the gauge of thickness of the metal from which the wedge nut is formed.

Furthermore, the construction and mode of manufacture of the wedge nut of the present invention is such that the wedging surfaces, including the arcuate peripheral portion of the nut opposite to the usual inclined planes thereof, which peripheral portion bears against the interior of the stem, is the result of a final coining operation which leaves such peripheral portion and the inclined surfaces themselves in a smooth highly finished condition and very accurately formed and disposed relative to each other.

The final coining operation by which the wedge nut of the present invention is formed further results in a widening of the inclined edge surfaces of the wedge nut so that such surfaces, which cam against the companion beveled surfaces of the handle bar post, are substantially wider than the thickness of the metal from which the wedge nut is formed, thus affording a more effective bearing area.

An exemplary embodiment of the present invention is illustrated in the accompanying drawing and described in detail in the following specification, both as to the construction of the the wedge nut and its mode of manufacture. However, it is to be understood that such embodiment is set forth by way of example and that the principles of the invention are not limited precisely thereto, excepting as defined in the appended claims.

In the drawing:

FIG. 1 is a side elevational view of a bicycle steering post employing one form of the wedge nut of the present invention;

FIG. 2 is a perspective view of the form of wedge nut illustrated in FIG. 1;

FIG. 3 is a top end view of the wedge nut of FIG. 2;

FIG. 4 illustrates a blank from which the same is formed;

FIG. 5 shows the same after the first forming operation;

FIG. 6 shows the same after the second forming operation; and

FIG. 7 shows the same after the third forming operation.

Like characters of reference denote like parts throughout the several figures of the drawing and, referring to FIG. 1, the numeral 10 designates generally a bicycle steering post of well known form which is generally the same as that illustrated in my prior patent identified above. The steering post 10 includes a depending tubular portion 11 which is beveled at its lower end as at 12 and is adapted to be inserted in the hollow upper stem portion of the front fork member of a bicycle. A screw or bolt 13 passes downwardly through the tubular portion 11 of post 10 and is engaged at its lower end by the wedge nut of the present invention, the same being designated generally by the numeral 14 in FIG. 1.

Referring now to the manner in which the wedge nut 14 is fabricated in the instance set forth herein by way of example, a trapezoidal blank 15 illustrated in FIG. 4 is bent into U-shaped form as at 16 in FIG. 5 with a pair of terminal wing portions 17. Referring to FIG. 6, the legs of the U-shaped portion are then formed inwardly to form a central cylindrical or tubular portion 18. In the third forming operation illustrated in FIG. 7 the wing portions designated 17 in FIGS. 5 and 6 are partially return bent as indicated at 19.

In the final forming operation, which comprises what is known as a coining or swaging operation, the return bent portions designated 19 in FIG. 7 are subjected to coining or swaging by pressure against the inclined surfaces of the edges of such return bent portions. This coining pressure presses the proximate or abutting portions of such return bent portions into an almost continuous arcuate form, as at 21 in FIG. 2 and FIG. 3, and flattens the aforesaid inclined edge surfaces as indicated at 22 in FIG. 2 and FIG. 3, whereby they present an increased bearing area against the beveled portion 12 of the tubular portion 11 of the steering post 10.

The central tubular portion 18 is then threaded to receive the threaded lower end of screw or bolt 13 and the finished wedge nut thus formed is shown in assembled position relative to the steering post in FIG. 1. It will be noted that the final coining or swaging operation produces smooth surfaces at the arcuate outer surface 21 and the flattened inclined surfaces 22 and, by the nature of this final forming operation, produces a part wherein the dimensional relationships between such arcuate surface 21 and the inclined surfaces 22 is uniform and highly precise.

Thus the wedge nut of the present invention when drawn into wedging position, bears smoothly against beveled surface 12 of the steering post and against the opposed interior wall surface of the hollow stem of the front fork member.

I claim:

1. A wedge nut comprising a continuous metallic strip wherein the central portion thereof is of cylindrical form, the ends of said strip extending radially from said central portion in juxtaposition, thence arcuately in opposite directions to lie along a common arc substantially concentric with said cylindrical portion to provide an external arcuate bearing surface, the terminal edges of said arcuate portions being formed to provide oblique coplanar inclined wedging surfaces facing generally away from said bearing surface, and the interior of said tubular portion being threaded to receive screw means.

2. A wedge nut comprising a continuous metallic strip wherein the central portion thereof is of cylindrical form, the ends of said strip extending radially from said central portion in juxtaposition, thence arcuately in opposite directions to lie along a common arc substantially concentric with said cylindrical portion to provide an external arcuate bearing surface, the terminal edges of said arcuate portions being formed to provide oblique coplanar inclined wedging surfaces facing generally away from said bearing surface, and the interior of said tubular portion being threaded to receive screw means, said oblique terminal edges being flattened to provide greater surface area than the raw edge of the metallic strip.

3. A wedge nut comprising a continuous metallic strip wherein the central portion thereof is of cylindrical form, the ends of said strip extending radially from said central portion in juxtaposition, thence arcuately in opposite directions to lie along a common arc substantially concentric with said cylindrical portion to provide an external arcuate bearing surface, the terminal edges of said arcuate portions being formed to provide oblique inclined wedging surfaces facing generally away from said bearing surface, and the interior of said tubular portion being threaded to receive screw means, said oblique terminal edges being swaged to form substantially coplanar wedging surfaces.

4. A wedge nut comprising a sheet metal member wherein the central portion thereof is in the form of a substantially closed cylindrical loop, the meeting ends of said loop extending radially from said loop in adjacency, thence arcuately in opposite directions to lie along a common arc substantially concentric with said loop to form an external arcuate bearing surface, the terminal edges of said arcuate portions being formed to provide oblique coplanar inclined wedging surfaces facing generally away from said bearing surface, and the interior of said loop being threaded to receive screw means.

5. The method of fabricating a wedge nut which comprises providing an oblong blank having parallel sides and oppositely oblique ends, forming a tubular portion medially across said blank, and forming the end portions of said blank to extend radially away from said tubular portion, thence arcuately in opposite directions to lie along an arc concentric with said tubular portion and form an external arcuate bearing surface having obliquely disposed coplanar terminal edges.

6. The method of fabricating a wedge nut which comprises providing an oblong blank having parallel sides and oppositely oblique ends, forming a tubular portion medially across said blank, and forming the end portions of said blank to extend radially away from said tubular portion thence arcuately in opposite directions to lie along an arc concentric with said tubular portion and form an external arcuate bearing surface, and swaging said oblique ends to form substantially coplanar inclined wedging surfaces.

References Cited in the file of this patent

UNITED STATES PATENTS

| | | |
|---|---|---|
| 640,165 | O'Connor | Dec. 26, 1899 |
| 993,940 | Adell | May 30, 1911 |
| 1,964,427 | Chandler | June 26, 1934 |
| 2,797,606 | Poupitch | July 2, 1957 |